June 5, 1956 J. C. CLARK 2,748,560

TWENTY-FOUR HOUR CLOCK WITH EXPOSED NUMERALS FOR TIME DIVISIONS

Filed Feb. 18, 1953 5 Sheets-Sheet 1

INVENTOR
Joseph C. Clark.
BY Frank H. Borden
ATTORNEY.

INVENTOR
Joseph C. Clark.
BY
Frank H. Borden
ATTORNEYS.

June 5, 1956 J. C. CLARK 2,748,560

TWENTY-FOUR HOUR CLOCK WITH EXPOSED NUMERALS FOR TIME DIVISIONS

Filed Feb. 18, 1953 5 Sheets-Sheet 3

INVENTOR
Joseph C. Clark.
BY Frank H. Borden
ATTORNEY.

INVENTOR
Joseph C. Clark.
BY
Frank H. Borden
ATTORNEY.

INVENTOR
Joseph C. Clark.
BY
Frank H. Borden
ATTORNEY.

United States Patent Office 2,748,560

Patented June 5, 1956

2,748,560

TWENTY-FOUR HOUR CLOCK WITH EXPOSED NUMERALS FOR TIME DIVISIONS

Joseph C. Clark, Merchantville, N. J., assignor to Atlas Instrument Company, Haddonfield, N. J., a partnership Application February 18, 1953, Serial No. 337,633

20 Claims. (Cl. 58—125)

This invention relates to clocks of the exposed numeral type, and especially to clocks for timing and indicating hour and minute sub-divisions of a twenty-four hour cycle, in exposed numeral indications.

While various clocks have been developed hitherto indicating time as divisions of a twelve hour cycle in a numeral exposure type of clock, so far as known, no clock has been successfully developed capable of the same sort of visual showing with divisions of time in a twenty-four hour cycle. In view of the well established use of the full twenty-four hour day for precise military and naval and related time designations, the importance of this type of horological indicator becomes clear.

It is among the objects of this invention to improve the art of clocks; to simplify trains of clock mechanism; to provide a compact and simple trouble-free clock with divisions of time into twenty-four hours; to improve details of clock train mechanism; to provide a twenty-four hour clock with digital columns indicating in sight windows graduations of the twenty-four hour time cycle, with all of the graduations of the same vertical size and of related lateral sizes; to provide a twenty-four hour clock in which the digits are on cylinders of the same external circumference; to provide a simple form of indicator by which in two fixed spaced sight windows an hourly progression of time intervals from "0—0" to "23" can be viewed; to provide three rings or cylinders bearing numerical indicia in operative association with four relatively fixed sight windows with timed actuating mechanism whereby stepped progression of the cylinders can be effected to show time designations from "0—0—0—0" (midnight) to "23—59" (one minute before midnight); to provide a twenty-four hour clock of displayed digit type with means for effecting independent changes of the hours designation; to improve clocks for use on ships; to provide a digit display twenty-four hour clock of substantially the same external size as a conventional twelve hour digit display clock; and to provide other objects and improvements as will appear as the specification proceeds.

In the accompanying drawings forming part of this description:

Figures 1, 2, 3:
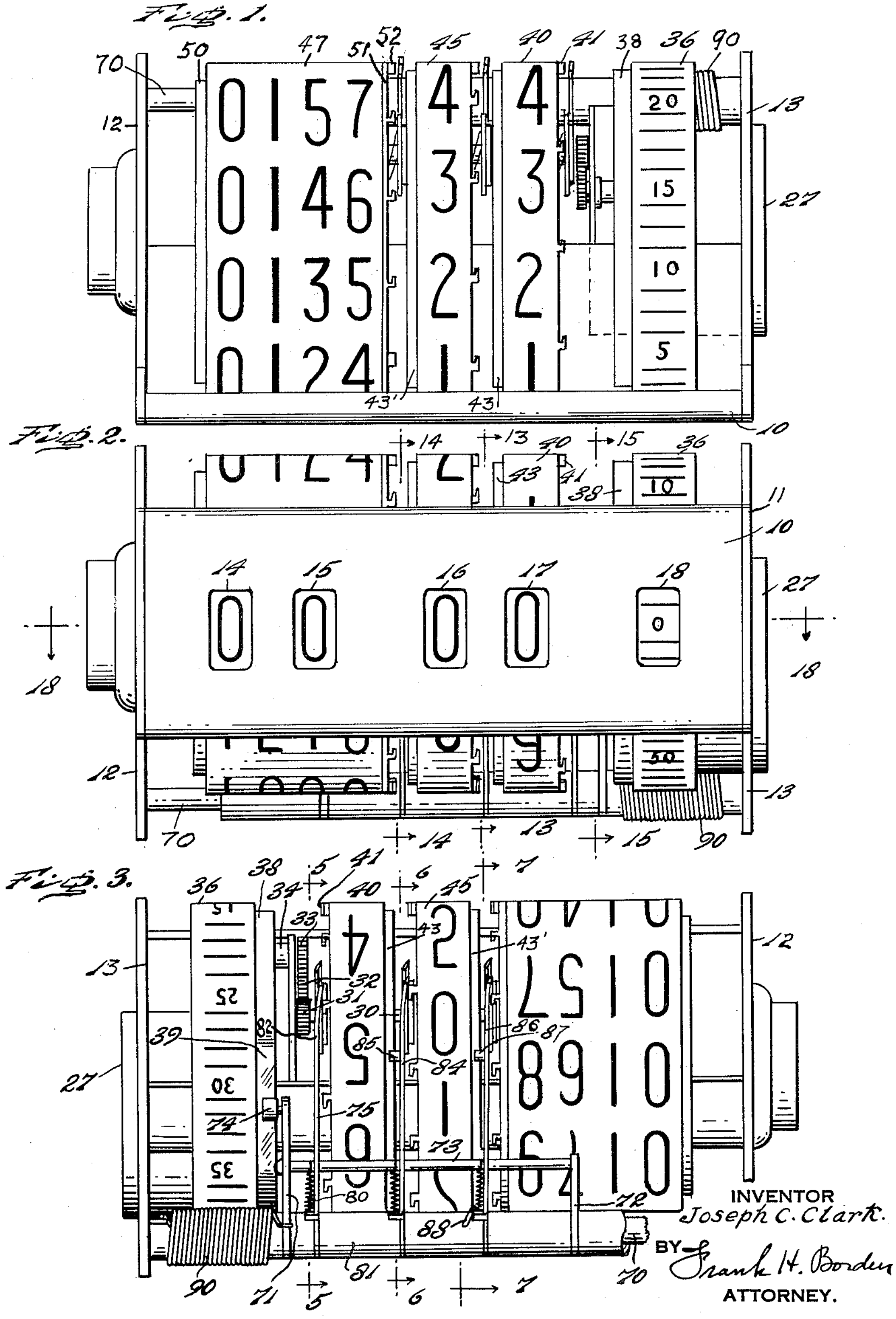
Fig. 1 represents a plan of the clock according to a presently preferred embodiment.
Fig. 2 represents a front elevation thereof, showing the panel having the digit display windows, with the digits displayed being illustratively all zeros, representative of "midnight" in time setting, and with reference to which all of the figures in the application are set.
Fig. 3 represents a rear elevation thereof.
Figure 4:
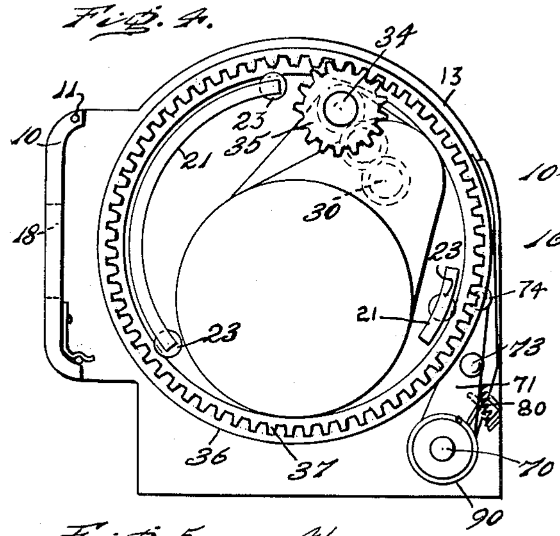
Fig. 4 represents an end elevation with one end plate removed showing the gearing for driving the seconds ring.
Figure 7:
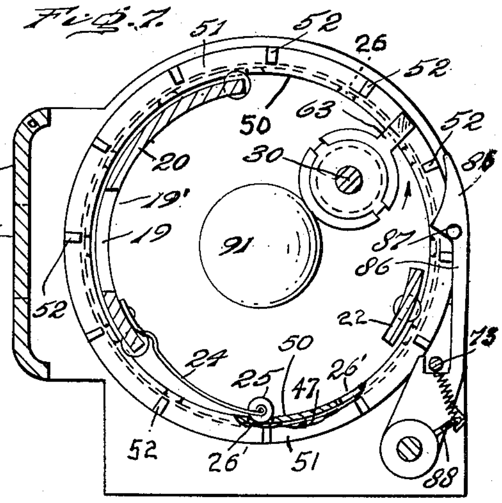
Figures 5, 6, 8, 9, 10, 11:
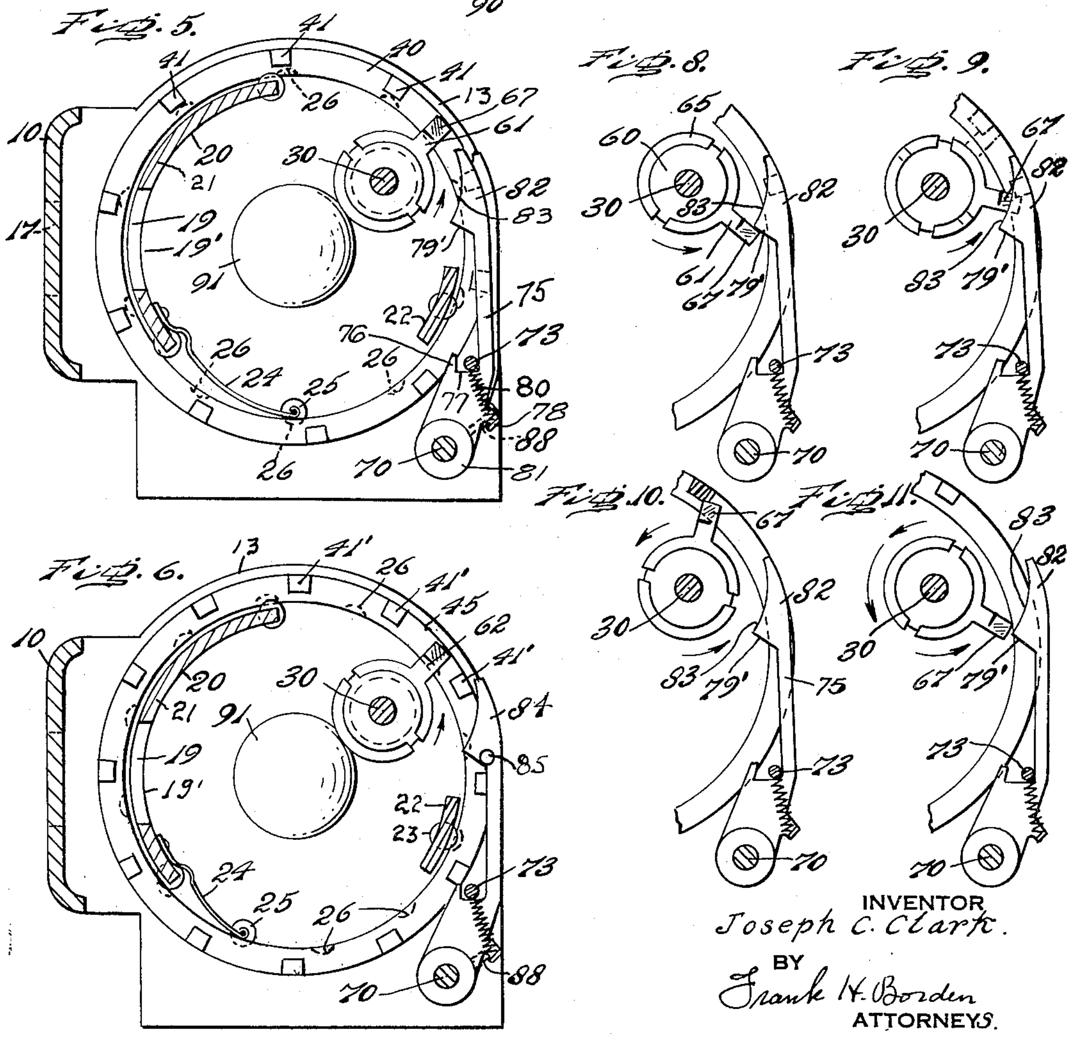

Figs. 5, 6, and 7 represent vertical sections taken on the lines 5—5, 6—6, and 7—7 of Fig. 3, respectively, and showing in elevation an edge of the units, tens and hour rings, with their respective actuating fingers on a common shaft, shown in section.

Figs. 8, 9, and 10 represent fragmentary sections, partially in elevation, of the relation of the rotating actuating finger in its guided approach toward and engagement with a single ear or hook on a ring (illustratively that shown in Fig. 5), following inward movement of the guide finger for the purpose, and respectively indicating the approach of the actuating finger about to pass behind the shoulder of the guide finger, its engagement with a given hook and movement therewith in a conjoint movement to the dotted line indicated, and finally the completion of the conjoint movement of the actuating finger with the single hook illustrated, just before disengagement therefrom takes place. For clarity all other hooks are removed.

Fig. 11 represents the same parts following withdrawal of the guide finger, showing the path of arcuate motion of the actuating finger with reference to the withdrawn guide finger.

Figure 12:
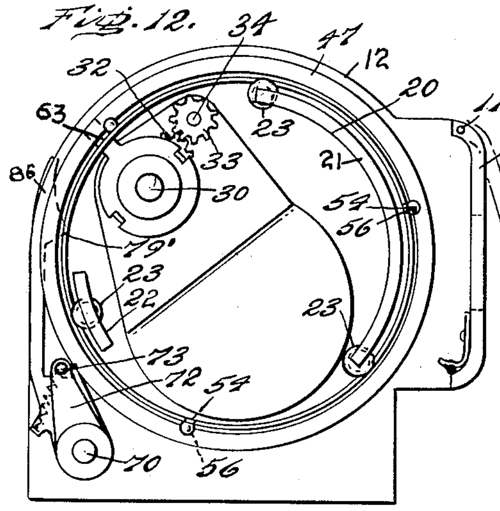

Fig. 12 represents an end elevation with the opposite end plate and its associated parts removed.

Figure 15:
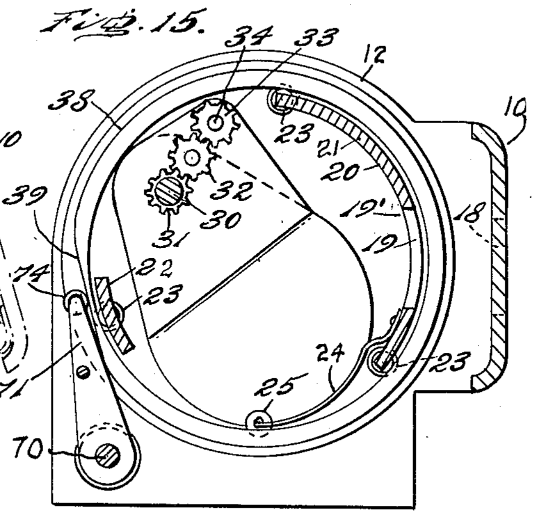
Figure 14:
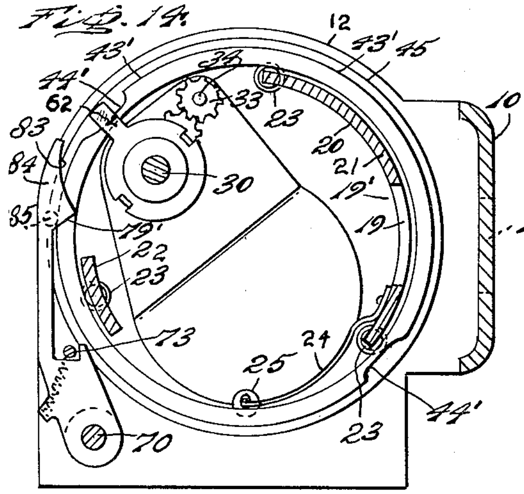
Figure 13:
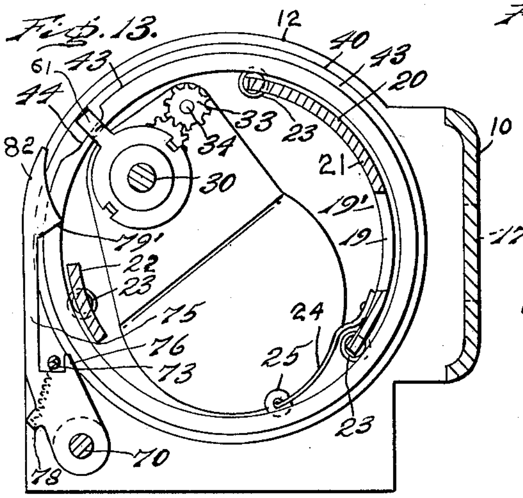

Figs. 13, 14 and 15 represents vertical sections taken on lines 13—13, 14—14, and 15—15 respectively, on Fig. 2.

Figure 16:
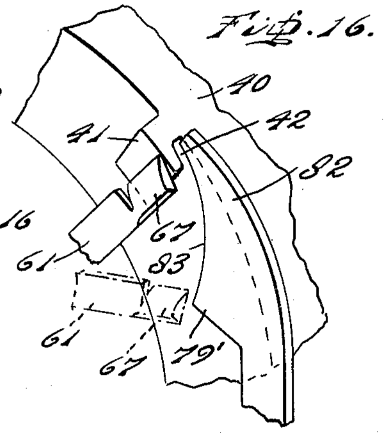

Fig. 16 represents a fragmentary perspective of the parts showing the relation of the ends of a moving actuating finger, a guide finger, and a hook on a ring, in the withdrawn attitude of the guide finger.

Figure 17:
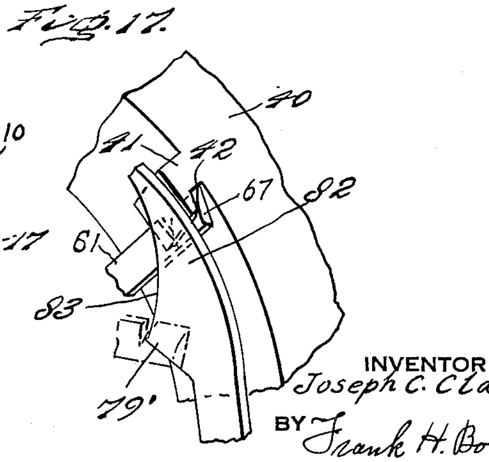

Fig. 17 represents a similar fragmentary perspective showing the relation of the same parts following movement of the guide finger into inward guiding position, and the location of the actuating finger after it has been led or guided thereby into engagement with a hook on the ring.

Figures 18, 19, 20:
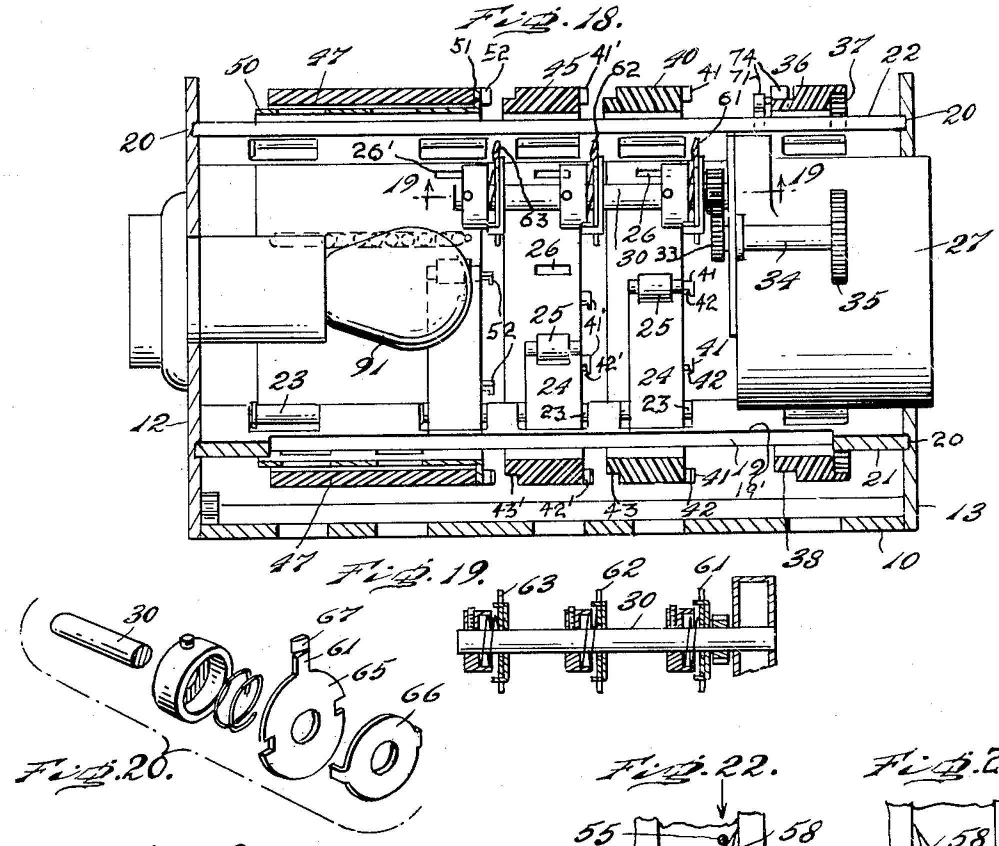

Fig. 18 represents a horizontal section taken on line 18—18 of Fig. 2.

Fig. 19 represents a fragmentary section on line 19—19 of Fig. 18, showing the common drive shaft and the respective actuating fingers mounted thereon.

Fig. 20 represents an exploded perspective of an actuating finger and the common shaft.

Figure 21:
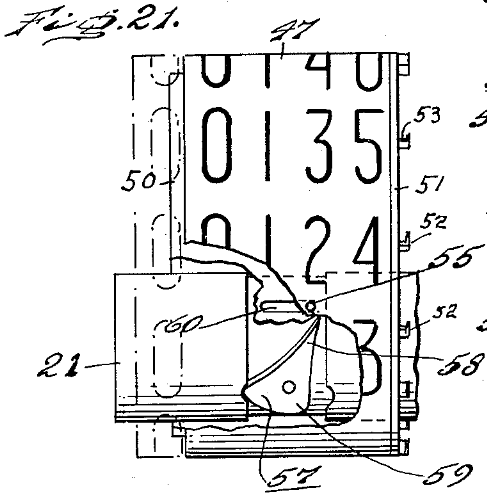
Figures 22, 23, 24, 25:
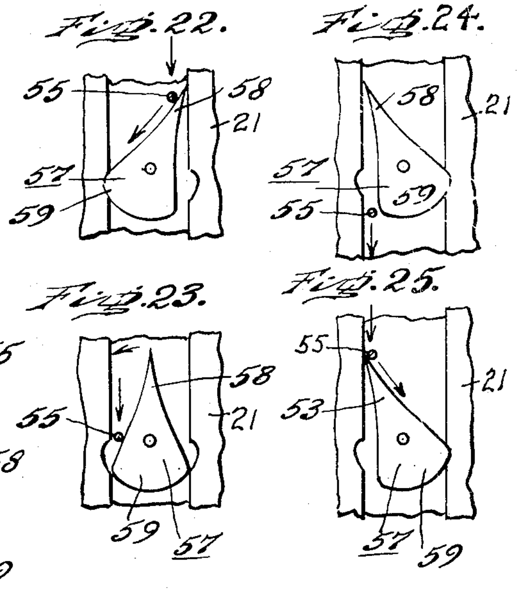

Fig. 21 represents a fragmentary plan of the hour ring with the panel removed, and broken away to show the camming device for effecting axial shift of the hour ring.

Figs. 22, 23, 24, and 25 represent schematic plans of the camming device showing progressively the axial shift and the resetting of the cam for the next succeeding reversed shift.

Figure 26:
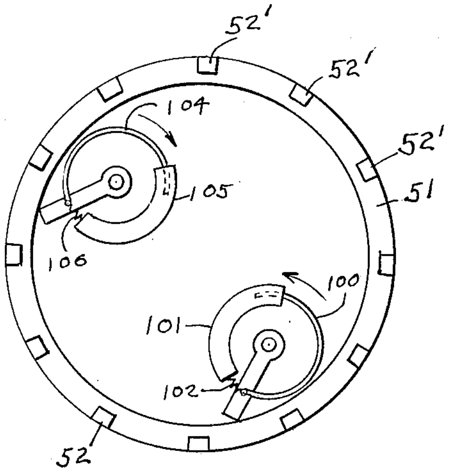

Fig. 26 represents a vertical section in schematic form showing two pivoted solenoid devices for respectively actuating the hour ring independently of other rings in either direction, as for use in ship clocks, by more or less remote control.

Figure 27:
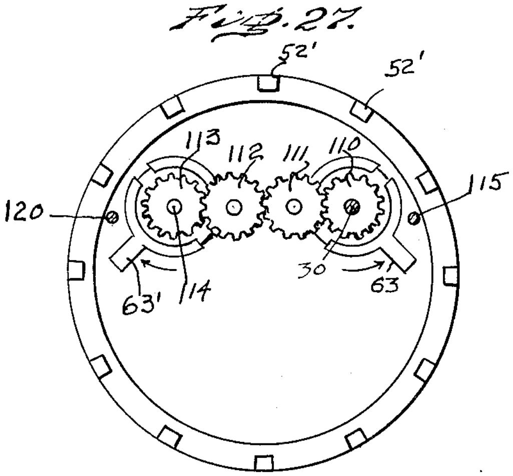

Fig. 27 represents a similar section of a modified form of actuating finger relation in which two oppositely rotating actuating fingers are provided, with solenoid-controlled members for deflecting either finger selectively into engagement behind a juxtaposed hook, to secure setting of the hour ring from a more or less remote control, using the drive shaft and actuating mechanism of the clock organization, with its support removed.

Figure 28:
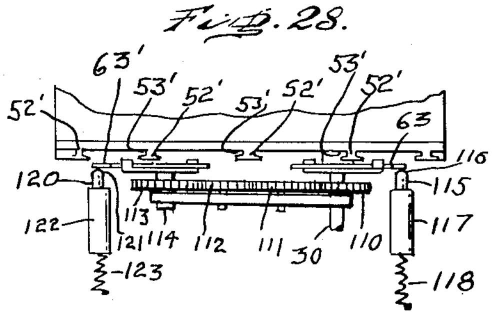

Fig. 28 represents a fragmentary plan of the mechanism of Fig. 27.

Figure 29:
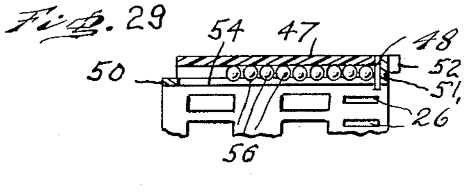

Fig. 29 represents a fragmentary axial section through the hour ring and its mounting sleeve.

In carrying out the invention in an illustrative embodiment, a timing driving mechanism is provided, which is preferably a synchronous motor, usually of the self-starting type, but which, of course, can be of any sort, including a wound spring device with an escapement. Preferably the driving mechanism is in mesh with and continuously drives a cylindrical or ring member graduated in "seconds", with reference to a "seconds" sight window of the clock case. A units minute cylinder or ring is provided for peripheral step-by-step advancement behind a "unit" minute sight window of the clock case, and mounting ten graduations from "0" to "9". This is energized periodically by a rotatable member, driven by the driving mechanism, in response to attainment of a predetermined angular setting of the "seconds" ring or cylinder. A "tens" minute cylinder or ring is provided for peripheral step-by-step advancement angularly behind a "tens" minute window, and which is graduated in twelve digits in two successive series of graduations from "0" to "5". This also is energized periodically by a rotatable member, driven by the driving mechanism, in response to attainment of predetermined angular settings of the "units" cylinder.

Finally, a wider "hour", axially shiftable cylinder is provided, bearing four peripherally aligned rows or series of digits graduations, each with twelve graduations, of which, illustratively, the first row comprises ten digits or numerals "0," and two digits or numerals "1," the second row comprises eight digits or numerals "1" and four digits or numerals "0," the third row comprises graduations from "0" to "9" with an additional "0" and a "1," and the fourth row contains graduations from "0" to "3" and then from "2" to "9." A plurality of horizontally aligned sight windows is provided in the case, including the recited units and tens minute windows, and also including a pair of "hour" sight openings in which, with one axial setting of the hour cylinder the transversely aligned figures in rows 1 and 3 are disposed, and successively, with intermittent progression, display hour numerals from "0—0" to "11," and in a different axial setting the transversely aligned figures in rows 2 and 4 are disposed in the pair of spaced "hour" sight windows, and with intermittent progression display hour designations from "12" to "23." The hour cylinder or ring is progressed step-by-step peripherally in angular motion by periodic energization by a rotatable member, driven by the driving mechanism, in response to attainment of predetermined angular settings of the "tens" cylinder, and is automatically caused to shift axially in one direction synchronously with one step in angular motion, to move rows 2 and 4 into the sight windows in shifting peripherally from "11" o'clock to "12" o'clock, and is automatically shifted in the other direction axially to move rows 1 and 3 from the sight windows synchronously with a step in angular motion in shifting peripherally from "23" o'clock to "00" o'clock.

Preferably the cylinders or rings are formed of transparent plastic coated to form opaque surfaces interrupted by recesses forming transparent indicia, so that an internal light source, either directly, or by passing through a ground glass or other dispensing element, illuminates the graduations instantaneously displayed in the respective sight windows.

For purposes of clarity, the entire housing or casing of the clock will not be shown. This is for the reason that it may be disposed in an instrument panel or the like. The only important housing element is an apertured panel 10, pivoted at 11 on end plate frame members 12 and 13 of the clock, so that the panel can be raised for exposure of the cylinders, to be described, in manually setting the clock, by turning the respective rings or cylinders against the slight friction interposed by an indexing roller. Panel 10 has a first and a second "hour" aperture or sight window, respectively 14 and 15. In these are displayed the hourly time graduations from "00" to "23." The panel contains a "tens" minute sight window 16. It also contains a "units" minute aperture or sight window 17, and preferably, although not essentially, a "second" sight window or aperture 18. Windows 16 and 17 display minutes from "00" to "59."

The frame end plates 12 and 13 are in mutually confronting spaced relation and are preferably grooved on their internal faces as at 20, to receive a main arcuate frame plate or support 21, and in peripheral spacing therefrom a smaller arcuate supporting plate 22 is mounted in said grooves. Main arcuate frame plate 21 is horizontally slotted as at 19 behind the sight openings of panel 10. This slot may be covered by thin paper or ground glass 19' for dispersing light from the source to be described. The supports or plates 21 and 22 are suitably anchored to the end plates, and mount arcuately spaced sets of rollers 23. The roller spacing of the rollers 23 is at approximately 120° about a common axis for all rings. The rollers are flanged so as to center and hold the respective rings or cylinders. The rollers 23 are in three sets of smaller rollers for the seconds, units, and tens, and one set of axially longer rollers for mounting the hours ring, all to be described. Spring fingers 24 are mounted to extend peripherally from an end of the main support plate 21 and mount indexing rollers 25 for successive engagement with axially extending indexing recesses 26 formed on the minutes rings or cylinders, and 26' for the hour cylinder as the rings or cylinders are progressed in angular motion.

End plate 13 mounts a preferably electrically energized constant speed motor, 27, of the self-starting synchronous type, which, through a gear reduction, has a driving output shaft rotation of known speed. Illustratively, let the output shaft speed be considered as four revolutions per minute. The output shaft 30, with this timed rate of rotation (one each fifteen seconds) carries three identical, axially aligned, actuating fingers or arms, to be described, and the axis of shaft 30 is eccentric to the common axis of the rings established by the sets of rollers 23. For effecting rotations of the seconds ring or cylinder, to be described, shaft 30 mounts a pinion gear 31, of a gear train comprising meshing pinion gears 31, 32, and 33, with gear 33 fixed on a shaft 34, on the opposite end of which is mounted a sprocket gear 35.

A seconds cylinder or ring 36 is provided, supported internally on the said respective rollers 23 of a set thereof, to support ring 36 with one edge portion thereof overlying the sprocket gear 35. The overlying edge portion of the ring 36 is internally toothed to form a ring gear 37, in constant mesh with the sprocket gear 35. The gearing is predetermined with the rotational speed of the shaft 30 so as to cause the seconds ring 36 to make one revolution in one minute. The ring, which is preferably formed of a transparent plastic, such as "lucite" or the like, has an opaque external surface in which sixty graduations are formed with numerals at 5 or 10 second intervals from "0" to "0." The graduations are routed out of the surface so that internal light, to be described, passes through the transparent plastic of the ring to illuminate the graduations as they successively and continuously pass across the sight window 18. The ring 36, on the opposite edge from the internal ring gear 37, preferably, has a roller guiding or bearing area 38 of slightly reduced diameter from the ring surface, and in predetermined angular relation to the "0" graduation of the seconds ring 36 the annular bearing surface 38 is ground off by a substantial chord plane forming a substantial "flat," as at 39, for a purpose to be described.

A "units" minute ring 40 is provided, having an opaque outer surface pierced into the transparency of the ring by routed-out graduations which, as noted, extend from "0" to "9" for a total of ten graduations. One side edge of the ring 40 is provided with ten axially extending generally rectangular hooks or dogs 41, each providing a recess 42 presenting rearwardly in respect to the direction of angular progression of the ring. These hooks are so disposed angularly with reference to the respective graduations as to be effective to center a given graduation in the sight window 17 when the actuating means to be described, has imparted one stroke against one hook. One edge of the ring 40 mounts a bearing surface 43, of slightly reduced diameter, which is provided with a cam recess 44, in predetermined angular relation to graduation "9" thereof, for purposes to be discussed.

The "ten" minute ring or cylinder 45, bearing twelve graduations in two sets of graduations "0" to "5," as noted, and similarly formed for illumination of the graduations, is mounted on supporting rollers and is provided with twelve hooks or dogs 41', forming rearward recesses 42', and a bearing surface 43' having cam recesses 44' in duplicate, each in proper coordinated angular relation to the showing of "5" in the sight window 16.

The "hour" ring or cylinder is a little different from the minutes ring in the sense that the support for the ultimate ring comprises an axially fixed rotatable sleeve 50, having a flange 51 mounting twelve hooks or dogs 52, forming rearwardly presenting narrow recesses 53. Sleeve 50 is mounted on a set of elongated flanged rollers 23 for guidance and support and the sleeve itself contains the indexing recesses 26' for successive registration with an indexing roller. The sleeve 50 is also provided with three evenly spaced (120° apart) axially extending slots 54 mounting axially aligned ball bearings 56 forming the ultimate support of the hour cylinder 47. Pins 48 extend inwardly from axially shiftable hour cylinder 47 into the respective slots 54, to force the ball bearings to axial movements in the slots and to anchor the hour cylinder and the sleeve together against relative angular motion so that they move together angularly as a unit.

Pivotally mounted on the main frame member 21, externally thereof, is the thin camming member 57, having a tapered nose 58 and enlarged rear 59 in the path of an inwardly projecting pin 55 carried by the cylinder 47 and guided in a suitable short axial slot 60 centered in the sleeve 50, and forming limits to the axial shifting motion of the hour ring or cylinder 47, indicated in dotted lines in Fig. 21. The latter ring bears the graduations already described, in the said four separate peripheral columns mentioned.

The drive shaft 30, eccentric to the common axis of all of the rings or cylinders and driven at its said fixed comparative speed, mounts three flexible or resilient ring-actuating fingers or arms. These are respectively a minute unit actuating finger 61, a "tens" minute actuating finger 62, and an hour actuating finger 63. The ring-actuating fingers are all alike, and each comprises an enlargement 65 lying generally in a plane perpendicular to shaft 30, mounting the instant finger, resiliently held against a fixed washer element 66, with the whole finger unit driven by the shaft 30. Each finger 61, 62, and 63, has a terminal portion 67, at a slight angle to the plane of the enlargement 65 thereof. The free outer ends of terminal portions 67 of the actuating fingers traverse an arcuate path substantially tangent to the periphery of the respective rings or cylinders, and normally in a general plane perpedicular to shaft 30 parallel to a plane perpendicular to the axis of the ring containing the outer faces of the hooks or dogs so as to pass closely beside, without touching any instantaneously juxtaposed hook on its associated ring. With the eccentricity of the axis of the rings and the axis of shaft 30, and with the shorter radius of the actuating fingers compared with that of the rings and with the substantial tangency of the periphery of finger travel to that of the juxtaposed ring, it will be seen that there is a portion of actuating-finger travel substantially equal to the distance between contiguous hooks or dogs on the ring or cylinder in which the sloped or slanted terminal portion intersects an axial extension of the ring. Suitable axial deflection of the terminal portion of an actuating finger toward its associated ring, by means to be described, would move the terminal portion out of its normal plane of arcuate movement. If this deflection occurs as the finger ascends, said finger would engage behind a given hook portion and be temporarily retained in the recess 42, 42' or 53 thereof as the actuating finger and ring move conjointly through a limited peripheral motion, advancing the given ring one step from one registered position to the next registered position. With the ultimate divergence of the peripheral paths of the actuating finger and of the hook on the ring or cylinder, the actuating finger is withdrawn generally radially out from the recess of the hook. At this point, due to the resilience of the finger it would return to its normal attitude and path of travel, clear of the hook portions.

In order to effect guidance and control of the rotating actuating fingers during selected portions of their respective travel, a shaft 70 is journalled in the end plates and rigidly carries a pair of spaced parallel arms, respectively 71 and 72, connected by a rod 73 parallel to shaft 70, in a pivotal assembly with the shaft 70. Arm 73 carries a roller 74 forced against the bearing surface 38 of the seconds ring or cylinder 36. The roller is urged against the bearing surface, and the rod 73 is urged inwardly toward the axes of the rings or cylinders by a torsion spring 90 surrounding shaft 70, anchored in end plate 12 and bearing against arm 71. When, in due course, the flat 39 passes under the roller 74, the entire organization of arms and rod 71, 72, and 73 can move inwardly a limited distance toward the common axis of the cylinders. A "units" minute actuating finger control guide comprising a shank portion 75 is pivoted on the shaft 70, and has an inner leg 76 spaced from the shank 75 by a recess or clearance 77, of greater width than the thickness of the rod 73. A lug or ear 78 is provided, rigid with the lower end of the shank 75 of the units guide finger, connected by a tension spring 80 to the rod 73, normally urging the units guide finger toward the rod 73 an inwardly toward the axis of the aligned digit cylinders. Finger 75 is mounted on a spacing sleeve 81, journalled on the pivoted shaft 70. At the upper end the reduced shank 75 merges into an overhanging shoulder 79' of an upper guide portion 82 of the unit guide finger, the inner edge of which is curved, as at 83, in general conformance with the arc of the tip end 67 of the actuating finger 61 to avoid undesired contact therewith in the arcuate sweep of the latter. The guide finger end 82 is predeterminedly sloped out of a diametric plane located at the juncture of the guide finger shank 75 and the shaft 70, inclined toward the edge of the "units" minute cylinder or ring 40, so that the end 82 lies just beside the peripheral edges of the respective hook portions 41, whereby when shank 75 is urged inwardly with inward movement of arm 71, the guide finger can move inwardly so that the end 82 thereof is close beside the edge of the hook 41 to which it is instantaneously juxtaposed.

The slope of the guide finger end 82 out of the diametric plane is such that its general plane is intersected just above the shoulder 79' by the path of rotation of the slanted end 67 of the actuating finger 61. Inward movement of the guide finger about the axis of shaft 70 therefore presents a sloping guide path for the advancing end 67 of the actuating finger 61, which, due to its flexibility, is forced laterally to engage behind the instantaneously juxtaposed hook 41, held against withdrawal axially of ring 40 by the side edge surface of the recess 42. The cylinder or ring 40 then travels through its measured angular change of position, during which the advancing guided finger 61 has relative radial motion to the hook 41, rising effectively during the first portion of the cycle of advance and withdrawing radially inwardly during the latter portion thereof, and finally passes both radially and axially out of the recess at the termination of the stepped progression of the ring 40. With release from the recess 42 through its own resilience, actuating finger 61 resumes its normal attitude on the shaft 30, and continues to clear all hooks on the ring or cylinder 40 during the next succeeding three revolutions and into its fourth revolution when it is again guided laterally against the ring 40.

It will be seen, of the guide finger just discussed, comprised of shank 75, etc., as the units ring 40 is to be advanced once each minute, the axially inward actuations of the guide finger 61 must occur once each minute, or during one of four revolutions of actuating finger 61. As long as the roller 74 bears on the annular portion of the bearing surface 38, the rod 73 is held outwardly from the cylinders, during which rod attitude the guide finger shank 75 is held outwardly against moving in toward the cylinder axis and no guiding functions can attach to the guide finger. However, when the flat 39 passes under the roller 74, the rod 73 moves inwardly, releasing the restraint of the rod on the guide finger shank 75, and through the spring tension of spring 80 the guide finger shank 75 is pulled into its guiding attitude. As the flat 39 only passes under the roller 74 once for each revolution of the seconds ring 36, although the actuating finger 61 makes four revolutions in that time, the actuating finger 61 makes three revolutions without affecting the units minute ring. On the fourth revolution, however, through its angular coordination with the flat 39 on the bearing surface 38 of the "seconds" ring 36, its traversing of the operative portion of its arcuate path is preceded by the guiding positioning of the guide finger shank 75 so that with the fourth revolution the ring 40 is moved peripherally forwardly one step, and the change of digits in the sight window 17 indicates the passage of one minute.

It will be clear that although nine successive steps can be made of ring 40 without necessarily being accompanied by complemental movement of the "tens" minute ring 45, the tenth step must be so accompanied. To this end, a second guide finger 84 is provided, similar in all respects to guide finger comprised of shank 75, etc., and similarly mounted and spring biased. This finger 84 is juxtaposed to the "tens" minute ring 45 to have normal clearance relative to its hooks 41', but mounts a stud or roller 85 bearing against the bearing surface 43 of the "units" minute ring 40. As the latter has a single cam recess 44 in its surface, the bearing surface 43 thereof holds the guide finger 84 out of guiding attitude, despite the deflection of the rod 73 once with the passage of each minute, until the stepped progression of the units minute ring 40 has brought the cam recess 44 under the stud 85. The next time thereafter that the flat 39 passes under the roller 74, and the rod 73 moves inwardly, both guide finger shanks 75 and 84 move inwardly on their common pivot on shaft 70, just preceding the fourth revolution of the actuating fingers 61 and 62, during which both are deflected laterally to engage behind the juxtaposed hooks of rings 40 and 45, to advance them both simultaneously one step. This effects a change of digital display in both sight windows 16 and 17, say, for instance, in moving the reading from "0—9" to "10."

Relatedly, it will be apparent that according to the standard time divisions, the tens column can and should move five steps without affecting the hours, as in the passage of time from 00 minutes to 59 minutes, but on the 60th minute the hour must advance one unit. To this end a third "hours" guiding finger 86 is provided, identical in all respects with both of the earlier described fingers, and similarly mounted and with similar functioning. The hours guide finger 86 mounts a stud or roller 87 bearing against the bearing surface 43' of "tens" ring 45. It will be recalled that this bearing surface has two recesses 44'. As the necessities are that the "hour" ring only respond to the final stages of a sixty minute period, it is necessary to prevent the movement of the hour guide finger 86 forwardly or inwardly until the completion of 60 minutes from the last preceding hour progression. To this end the sleeve of guide finger 84 mounts a pin 88 in the path of rocking movement of the lug or ear 89 of the guide finger 86. As there are two notches or cam recesses 44' on the bearing surface 43' of the ring 45, it is necessary for one of these recesses to be under the stud or roller 87 at the instant the frame, including the rod 73, moves inwardly toward the cylinder axis, as the roller 74 passes onto the flat 39 of the bearing surface 38 of the "seconds" ring 36, so that the hour guide finger 86 can only be energized to guiding position or attitude when the "tens" ring 45 has reached that part of its cycle requiring a stepped movement of the hour ring. With the arrangement shown it will be seen that although the hour guide finger 86 can only move inwardly when the recess associated with attainment of "5" on the "tens" peripheral column of figures permits, the "tens" digital progression can still occur on schedule without affecting the hour ring.

In order to effect a preferred illumination of the digits appearing in the sight windows, a frosted glass or device of similar effect 19' is mounted on the frame member 21 across slot 19 behind the sight openings, and a source of illumination 91 is provided, the emanations from which pass through the light disperser 19' and through the "lucite" or like transparent rings, to display and illuminate the exposed digits of the organization.

It will be clear that in the progression of the hour ring or cylinder 63, both "11" and "23" are associated with the axial shift of the cylinder 63.

The operation of the device is quite simple, but efficient. Let it be assumed that the various rings or cylinders have been turned so that in the sight windows there is displayed "00—00," representing midnight, as an assumed starting position. With the energizing or driving source 27 started, and the internal lamp 91 illumined, the said "00—00" is displayed in the sight windows. If the assumption is that, contemperaneous with the attainment of the displayed figures, the roller 74 of the frame comprising the arms 71, 72, and rod 73 is, in its static rest condition, bearing against the annular portion of the bearing surface 38, and the "seconds" ring or cylinder 36 is turning, as are all of the actuating fingers 61, 62 and 63, rotating with shaft 30. At this point, of course, all guiding fingers are withdrawn, radially of the cylinders, from guiding position, so that three revolutions of all actuating fingers occur without actuation of any ring or cylinder. Toward the end of the first minute, the flat 39 passes under the roller 74, and the rod 73 moves inwardly toward the axis of the rings or cylinders. However, at this juncture, the stud 85 of guide finger shank 84 rests on an annular portion of the bearing surface 43 of ring 40, and the stud 87 of guide finger 86 rests on an annular portion of the bearing surface 43' of the "tens" ring 45, preventing inward movement of the last two mentioned guide fingers as the first described guide finger shank 75 moves inwardly, following roller 74 on the flat 39. Therefore, the only actuating finger which functions at this point is finger 61, moving ring 40 one step and changing the reading in the sight windows from the illustrative "00—00" to "00—01." No change occurs in sight windows 14, 15, and 16 until digit 9 has appeared in window 17 at time "00—09." This has brought recess 44 of bearing surface 43 of "units" ring 40 under the stud 85 of the "tens" guide finger 84, so that after the three non-operative rotations of all of the actuating fingers 61, 62, and 63, with inward movement of the roller 74 on the flat 39 of bearing surface 38, both guide finger shanks 75 and 84 move inwardly, so that the fourth rotation of the respective actuating fingers effects peripheral actuation of both rings 40 and 45, peripherally forward one step, marking a change in the indication to "00—10." Continued rotation of the parts through all of the "tens" column eventually brings the indication to "00—59." At this juncture the stud 87 of guide finger 84 is disposed over the recess 44' associated with one of the digits or numerals "5" on ring or cylinder 45. Prior to the fourth revolution of the respective actuating fingers, and attainment of the flat 39 under the roller 74, the inward movement of the rod 73 brings all of the guiding fingers forwardly, or inwardly, so that the fourth revolution of the respective actuating fingers finds engagement of each with a hook on its juxtaposed ring, and the "hour" cylinder moves one step in synchronism with the "tens" and "units," and the indication turns to "01—00." So it continues. When the "hour" ring 47 attains "11" or "23," the next succeeding stepped movement is accompanied by axial sliding movement and the reading becomes either "12—00" or regains the reading "00—00."

It will be evident that the driving train of mechanism is normally out of contact with the driven elements, having at best a few seconds of intermeshed engagement out of each sixty seconds of time, so that raising the panel affords enough area of the rings therebehind as to conduce toward facile manual setting of any or all of the rings in between meshing interconnections. All that is necessary is to look at the seconds ring to note its proper angular position to effect such setting. The settings or resettings may be in either direction for all of the rings.

The free rotatability of the rings against the intermittent restraint of the respective indexing devices, conduces to easy setting of the clock, which makes it perfectly adapted to use on shipboard, where date line changes makes changes in the hour designation obligatory.

In the case of large ships where there may be a great number of clocks of the type made according to the invention described, it may be desirable to have the passage across date lines in one sense or the other be a matter of control from the bridge, for instance, of the ship. For this purpose the modifications of the device shown in Figs. 26 and 27 are illustrative of the type of controls that may be used to effect motion or adjustment of the hour ring from a more or less remote point. Usually there will be a circuit controller operable from a single control point for simultaneously actuating electrical devices for resetting the hour designation of a plurality of clocks.

Referring to Fig. 26, a simplified form of hour resetting mechanism is disclosed, comprising a solenoid-operated plunger 100, operative in solenoid coil 101, against the retractive urge of a spring 102, and mounted in operative relation to the respective hooks 52 of the hours ring. The plunger may be curved and be disposed outwardly or inwardly of the hooks so that when the solenoid coil is energized with suitable current from a master control, the advancing plunger 100 engaging behind a hook 52′ advances the hour ring one step. Disruption of the circuit through the solenoid coil retracts the plunger for engagement behind another hook 52, if repeated ring motion in one angular sense is to be effected. Obviously, this one solenoid plunger operative in the line of normal progression of the hours ring can advance the ring one hourly indication, or with repeated use, a practically infinite number of hours steps in the same direction. This might be used to effect a twenty-three hour advance, for a resultant rearward step of one hour. The solenoid will therefore be used for one step in one direction of angular hour ring progression for one sense of resetting of the hour ring, or for twenty-three steps in the same angular direction for progression of the hour ring in the opposite sense.

For quickness of resetting, it is contemplated that if desire a second solenoid plunger 104 can be provided presenting oppositely, so as to bear against the opposite face of the juxtaposed hook 52′, working in solenoid coil 105 against the urge of tension spring 106, for reversed actuation of the hours ring.

Assuming that the hour ring is adjusted from the bridge of a ship, the operator on the bridge, by looking at the clock on the bridge, can know when the driving train is clear of the driven rings on all clocks, and by suitable actuations of circuit controllers can advance or retract the hour rings of all clocks in the circuit the step necessary by the position of the ship.

Referring to Fig. 27 and Fig. 28, an alternate procedure and structure is disclosed. In this case the shaft 30, carrying actuating finger 63, also mounts a pinion gear 110 of a train of gears 110, 111, 112, and 113. Final gear 113 is mounted on a shaft 114, mounting a flexible actuating finger 63′, turning oppositely to finger 63. Shaft 114 is mounted with its axis eccentric to the common axis of the rings generally in a horizontal plane continuing the axis of shaft 30, preferably, and the finger 63′ turns in synchronism with, but oppositely to, finger 63. The hooks 52′ are slightly modified from hooks 52 in the sense that they have recesses 53′ presenting in both respective angular directions. During normal rotations of the mechanism train described the fingers 63 and 63′ pass close to but out of contact with spaced hooks 52′. A pair of solenoid plungers and actuators is provided, of which one comprises a camming-ended plunger 115, which may be semi-spherical in its forward end, as indicated at 116, mounted in solenoid coil 117, normally retracted by tension spring 118. The axis of the plunger 115 is parallel to the common axis of the ring and to those of shafts 30 and 114, and is so located relative to the finger 63 as to move into camming or guiding relation thereto, during retraction of the guide finger 86. When solenoid coil 117 is energized and the plunger forced inwardly, the advancing finger 63 engages the rounded end 116 of plunger 115 and is forced axially of the shaft 30 to engage behind the juxtaposed hook 52′ to advance the hour ring one step. A reversing second solenoid plunger 120 is provided, having a similar camming end surface 121, operative in solenoid coil 122, against retracting spring 123, and juxtaposed to the path of rotation of the reversing actuating arm 63′. When the solenoid coil 122 is energized, as from the master control of the ship, the plunger 120 is advanced into the path of upwardly advancing finger 63′, the latter is forced axially of the shaft 114 into engagement behind the adjacent or juxtaposed hook 52′, in the oppositely presenting recess 53′, to cause the rotation of arm 63′ to move the hour ring in the reverse direction one step.

Although the engageable surfaces, means, or elements on the rings for intermittent contact by the rotating actuating finger, in connection with the particular organization disclosed, have been characterized as hooks, i. e. as having a recess or recesses within which the actuating finger end is received, and by which the axial deformation of the actuating finger is retained during the limited conjoint rotation of the finger and ring, this is not essential within the broader aspects of the invention. It will be cle clear that with an actuating finger disposed for controlled axial shifting without reliance upon the guide fingers illustrated for effecting such axial motion of the actuating finger, as is contemplated as within the broader aspects of the invention, the engageable means or elements on the rings may be mere shoulders, abutments, pins, ears, teeth, dogs, or any other surface or element or other means against which an actuating finger can react to secure ring advancement. Indeed, the engageable means may be mounted on the ring either as a projection therefrom, or as a recess formed in the edge thereof, as will also be evident.

The simplicity and effectiveness of the invention for the purpose will be evident, as will the fact that many changes can be made in the invention without departing from the spirit thereof. In this connection it will be clear that the particular time intervals, gearing and guide-actuating means are purely illustrative, and obviously may be changed for a new organization effecting similar results. It has been mentioned that an electric motor is preferred but that an ordinary timing device of the manually-wound type can be used. It will be understood further that although it is preferred to view the digits as disclosed, the illumination may be removed, or on the contrary may be used to project beams on a screen, to remotely display the time division of the twenty-four hour time cycle.

Having thus described my invention, I claim:

1. In clocks, a support, an hour ring mounted on the support, said ring bearing twelve axially aligned rows of numerals in substantially even spacing peripherally of the ring, the respective numerals of one axial row being in respective peripheral rows and one pair of alternate numerals in a given axial row representing A. M. hours and the remaining alternate numerals in said given row representing P. M. hours, means imparting step by step angular movement to said hour ring, and means for effecting an axial shift of said hour ring equivalent in distance to the axial spacing between adjacent peripheral rows of numerals thereon.

2. In clocks, a support, an hour ring mounted on the support, indicia in four rows disposed peripherally about the hour ring, two fixed sight windows mounted on the support in juxtaposition to said hour ring of spacing such that indicia on two of said rows are displayed in the respective sight windows, and means for effecting an axial movement of said hour ring to display indicia of the other two of said rows in said sight windows.

3. In clocks, a support, two horizontally aligned spaced windows mounted on the support, an hour ring mounting horological indicia in several peripheral rows, means mounting the hour ring for stepped progression whereby indicia of alternate rows are displayed in said sight windows, and means responsive to a selected step of progression for axially shifting the hour ring to display indicia of other alternate rows in said sight windows.

4. In clocks, a support, a hollow sleeve mounted on the support for rotation in an axially substantially fixed path, an hour ring mounting four peripherally extending respective rows of numerals mounted on said sleeve, means engaging the ring and the sleeve for conjoint peripheral motion, said ring being mounted for axial sliding motion on and relative to said sleeve between limits, and means responsive to rotation of the ring and sleeve for effecting axial movement of the ring relative to the sleeve to one of said limits at one angular point of rotation of said sleeve, and for effecting axial movement of the ring relative to the sleeve at another point of rotation of said sleeve to the other of said limits.

5. In clocks, a support, defining means on the support defining two fixed observation areas in horizontal spaced alignment, an hour ring mounted on a horizontal axis on said support and mounting four peripheral rows of numerals of such axial spacing that one row is concealed behind the space between the defined observation areas while another row is concealed behind the defining means beside an area, while numerals of rows respectively adjacent those concealed are displayed in said areas, means for progressively moving said hour ring in axially fixed relation to the said areas to successively display numerals of said two respective adjacent rows, means synchronized with said progression for axially shifting said hour ring to display numerals of the previously concealed rows in said areas while concealing those previously displayed rows behind said defining means, said means for progressively moving said hour ring functioning to successively display numerals of said previously concealed rows in axially fixed relation in said areas.

6. In clocks, a support, defining means on the support defining two fixed observations areas in horizontal spaced alignment, an hour ring mounted on a horizontal axis on said support and mounting four peripheral rows of numerals of such axial spacing that one row is concealed behind the space between the defined observation areas while another row is concealed behind the defining means beside an area, while numerals of rows respectively adjacent those concealed are displayed in said areas, means for progressively moving said hour ring in axially fixed relation to the said areas to successively display numerals of said two respectively adjacent rows, means synchronized with said progression for axially shifting said hour ring to display numerals of the previously concealed rows in said areas while concealing those previously displayed rows behind said defining means, said means for progressively moving said hour ring functioning to successively display numerals of said previously concealed rows in axially fixed relation in said areas, said synchronized means further operative functionally with said progression for again axially shifting said hour ring in the opposite sense to again display numerals of said two respectively adjacent rows in a continuous cycle from "0—0" through "2—3" to "0—0" through a full twenty-four hour cycle.

7. In clocks, a ring having an axis of rotation and mounting on axial extensions of the ring a plurality of peripherally spaced hooks the edges of which lie in a common plane, a time-controlled shaft having an axis eccentric to that of the ring, an axially resilient actuating finger mounted on the shaft and having an arcuate path of rotation intersecting and substantially tangent to the ring in axial projection, said finger having a normal rotational path spaced relative to the common plane of the edges of said hooks so that the finger clears the hooks during certain rotations of the shaft, a guide finger, means mounting the guide finger adjacent said common plane of said edges for movement from a normal position out of the arcuate path of said actuating finger to a secondary position intersecting said arcuate path, said guide finger being operative in its secondary position to deflect said actuating finger axially across the common plane of the edges of said hooks to cause engagement thereof with a juxtaposed hook to peripherally move said ring and time-controlled means for advancing said first means from its normal to its secondary position.

8. In clocks, a seconds ring, means for continuously rotating said ring through one rotation per minute, a bearing area on said ring including a flat, a tilting frame, means mounting the frame for tilting movement, means on said frame engaging said bearing area and moving said frame on its pivot when the flat passes thereunder, a unit ring, means mounting the unit ring for rotation about an axis, said unit ring mounting edge-engageable means, a shaft having an axis parallel and eccentric to the ring axis, an actuating finger mounted for rotation with said shaft normally clear of said engageable means in a path of rotation generally tangential to and intersecting the unit ring in extension, a guide finger, means mounting the guide finger for movement between a normal position adjacent said engageable means out of the path of rotation of said actuating finger and a secondary position at which it intersects said path of arcuate motion to deflect said actuating finger toward said engageable means, means for rotating said shaft at a timed rate, and means responsive to frame tilting for moving said guide finger into its secondary position to cause engagement of the actuating finger and an engageable means for a partial conjoint rotation of the actuating finger and said unit ring.

9. In clocks, a support, a seconds ring, a unit ring and a tens ring, means mounting the respective rings for rotation about an axis, said seconds ring and said unit ring having annular bearing areas with effective recesses, means for continuously rotating the seconds rings at the rate of one revolution per minute, a shaft eccentric to the axis of the rings and mounting a unit-actuating finger adjacent the unit ring and a tens-actuating finger adjacent to the tens ring, means for rotating said shaft in timed revolutions with the respective actuating fingers having normal paths of arcuate motion out of contact with the respective rings but generally tangential to said rings in axial extension, a unit guide finger and a tens guide finger, means mounting the respective guide fingers for movement between a normal position adjacent an edge of the respective unit and tens rings out of contact of the rotating actuating fingers and a secondary position in which the guide fingers intersect the arcuate paths of said actuating fingers, respectively, to deflect said actuating fingers toward the respective rings to which they are juxtaposed, means on the said unit and tens rings engageable by the respective actuating fingers in deflection for partial conjoint rotations of the actuating fingers and the respective juxtaposed rings to advance the respective rings angularly, bearing means on the tens guide finger engaging the bearing area of said unit ring preventing movement of the tens guide finger out of its normal position until the recess in that said bearing area moves under the bearing means, and means responsive to attainment of a predetermined angular location of the effective recess on the seconds ring for effecting movement of the units guide finger with each rotation of the seconds ring, and also for effecting synchronous movement of the tens guide finger when the recess in said bearing area of said unit ring is under said bearing means.

10. In clocks, a seconds ring, means mounting the seconds ring for timed rotation, a unit ring, a tens ring, and an hour ring, means mounting said last recited three rings for rotation on a common axis, said seconds ring having a bearing area including a flat, said unit ring mounting edge-engageable means and a bearing area having a recess, said tens ring mounting edge-engageable means and a bearing area having two angularly spaced recesses, said hour ring comprising a sleeve mounted for rotation in a fixed path and a ring mounted to rotate with the sleeve, said sleeve mounting edge-engageable means, a time driven shaft mounting three actuating fingers respectively juxtaposed to the respective unit, tens and hour rings, on an axis eccentric to the said ring axis whereby the actuating fingers have normal rotational paths adjacent but out of contact with the engageable means on the respective juxtaposed rings, a unit guide finger adjacent the unit ring, a tens guide finger adjacent the tens ring mounting bearing means engaging the bearing area of said unit ring, and an hour guide finger adjacent the hour ring mounting bearing means engaging the bearing area of said tens ring, means mounting the respective guide fingers for movement between a normal position adjacent the respective juxtaposed rings out of contact by the respective actuating fingers and secondary positions in which the path of rotation of said actuating fingers is intersected to deflect the respective actuating fingers into the peripheral line of the engageable means thereof to effect a partial conjoint rotation of the respective rings and actuating fingers, means responsive to attainment of a predetermined angular positioning of the flat on the bearing area of the seconds ring for moving the units guide finger into its secondary positioning once each revolution of the seconds ring, and synchronously for moving the tens guide finger into its secondary position when in angular progression of the unit ring the recess in the bearing area thereof passes under the bearing means on the tens guide finger, and synchronously for moving the hour guide finger into its secondary position when in angular progression a recess in the bearing area of the tens ring passes under the bearing means on the hour guide finger.

11. In clocks, a support, a sleeve, means journalling the sleeve for rotation about an axis, a plurality of axial slots in the sleeve in generally even spacing peripherally thereof, ball bearings in the slots, an axial guide slot in the sleeve, a tapered cam, means mounting the cam for limited pivoted motion on the frame within the sleeve, an hour ring mounted on the ball bearings, and having means extending into the respective axial slots and anchoring the hour ring and the sleeve for conjoint angular motion, a radial pin mounted on the ring extending through the guide slot in the sleeve and extending radially inwardly beyond the outer surface of said tapered cam so as to engage same in the rotational progression of the sleeve and ring, said cam effective to move said radial pin axially in the guide slot in the sleeve and thus to effect limited axial shift of the hours ring on the sleeve in one sense with one cam positioning and in the opposite sense with the other cam positioning, said cam and pin correlated in proportions and dispositions whereby the cam is positioned by relative movement of the radial pin past the cam.

12. In clocks, a rock shaft, spaced arms mounted on the shaft, a rod extending between the arms, a roller on one of the arms, a seconds ring, an annular bearing area on the seconds ring having a flattened surface portion, spring means urging the roller against the bearing area and operative to move the rod inwardly when the roller contacts the flattened area portion, a unit ring having peripherally spaced axially extending engageable means the edges of which lie in a plane perpendicular to the axis of the ring, a time controlled drive shaft eccentric to the axis of the unit ring, a flexible actuating finger mounted for rotation with the shaft and susceptible to axial deflection out of a normal plane of arcuate movement adjacent the plane containing the edges of the engageable means so as normally to clear same, a unit guide finger pivotally mounted on said rock shaft having a shank movable relative to said rod, spring means urging said shank toward said rod, said guide finger being sloped relative to said perpendicular plane and having a normal position adjacent the peripheral line of said engageable means, out of contact by said rotating actuating finger, and movable with inward movement of said rod to a secondary position at which the sloped portion intersects and extends across the normal plane of rotation of said actuating finger to deflect the finger and to guide it against an instantaneously juxtaposed engageable means to establish limited conjoint rotation of the actuating finger and unit ring.

13. In clocks, a rock shaft, spaced arms mounted on the shaft, a rod extending between the arms, a roller on one of the arms, a seconds ring, an annular bearing area on the seconds ring having a flattened surface portion, spring means urging the roller against the bearing area and operative to move the rod inwardly when the roller contacts the flattened portion, a unit ring, a tens ring, and an hour ring, each ring having peripherally spaced axially extending engageable means the edges of which lie in planes perpendicular to the common axis of the respective rings, a drive shaft eccentric to the common axis of the rings, three flexible actuating fingers mounted for rotation with the shaft and each susceptible to axial deflection out of a normal plane of rotation, said fingers so spaced as to have the said normal plane of rotation adjacent but spaced from the respective diametrical planes of the respective rings so as to clear same during normal rotation, a units guide finger, a tens guide finger and an hours guide finger pivotally mounted on said rock shaft and each having a shank movable relative to said rod, spring means urging said respective shanks toward said rod, said guide fingers being sloped relative to said perpendicular planes and each respectively having a normal position adjacent the peripheral lines of the engageable means of the respective rings out of contact with the respective rotating fingers on said driven shaft, and movable inwardly with said rod to secondary positions at which the sloped portions intersect and extend across the normal plane of rotation of the respective actuating fingers to respectively deflect same and guide them against an instantaneously juxtaposed engageable means of the respective rings to establish limited conjoint rotation of the fingers and rings, said tens guide finger having means responsive to the positioning of the unit ring to move inwardly with the rod into its said secondary positioning only when the units ring is in a predetermined angular setting, and said hours guide finger having means responsive to the positioning of the tens ring to move inwardly with the rod into its secondary positioning only when the tens ring is in a predetermined angular setting.

14. In clocks, a seconds ring, means for rotating said seconds ring continuously at the rate of one revolution per minute, a unit ring, a tens ring and an hours ring, means mounting the rings for rotation about a common axis, a drive shaft eccentric to the common axis, three aligned actuating fingers on said shaft each juxtaposed to a respective ring, means correlated with the second ring for rotating the shaft and the respective aligned fingers a predetermined number of revolutions per minute, engageable means on the respective rings normally uncontacted by the respective actuating fingers, means operative cyclically at one revolution of the said predetermined number for causing the appropriate actuating finger to engage an engageable means on the unit ring to advance same one step, means operative cyclically at a predetermined greater number of revolutions of the shaft than for the cyclic unit ring actuation for causing an appropriate actuating finger to engage an engageable means on the tens ring, means operative cyclically at a predeterminedly greater number of revolutions of the shaft than for the cyclic tens ring actuation for causing the remaining actuating finger to engage engageable means on the hour ring, and means for indexing the respective rings whereby engagement of an actuating finger with engageable means on a given ring advances the latter a step between indexed positions.

15. In clocks, a seconds ring, and means for rotating it continuously, a unit ring, a tens ring, and an hours ring, means mounting the last three rings for rotation about a common axis, a driven shaft eccentric to the common axis, three axially aligned actuating fingers on said shaft, comprising a units finger, a tens finger and an hours finger, means for driving the shaft at a timed rate, means for causing the units finger to advance the units ring one step every minute, means for causing the tens finger to advance the tens ring one step every ten minutes, means for causing the hours finger to advance the hours ring one step every sixty minutes, numerals on the hours ring in four peripheral columns of twelve numerals length evenly spaced on the hours ring, and means effecting an axial shift of the hours ring as a function of instantaneous angular shifting to indicate twenty-four hours of time division.

16. In clocks, a units minutes ring, a tens minute ring, and an hour ring, means journalling said rings for angular motion about a common axis, said rings each calibrated into digital units, each ring having a plurality of axially projected peripherally spaced hooks, in a general plane perpendicular to said common axis, means defining sight windows for digits on said respective rings, a time controlled continuously driven organization comprising rotating axially spaced units, tens and hours fingers normally respectively juxtaposed to but rotating clear of said respective planes of the hooks of the respective rings on an axis eccentric to the axis of angular motion of said rings and on a shorter radius than the radii of the respective rings, and time controlled means for intermittently moving selected fingers across said planes of the hooks of selected rings and coupling said organization to the selected ring by engagement of an instantaneously aligned finger and hook on such ring to progress said ring in orderly progression of time divisions.

17. A clock as recited in claim 16, in which the intermittent coupling means for a given ring comprises means effecting shift of a portion of the actuating mechanism axial of the axis of rotation of said organization.

18. In clocks, a support, an hour ring mounted on the support, means guiding the hour ring for axial movement relative to the support between two spaced limits, pin means mounted on and projecting substantially radially from said ring, means imparting step-by-step angular movement to said ring whereby said pin means traverses a peripheral path with said ring determined by the limit to which said ring has been axially moved, cam means having portions in the peripheral path of motion of said pin means with said ring, means pivoting said cam means to said support for oscillation between limits, said cam means and pin means effecting an organization whereby the pin means advancing on its peripheral path at one limit of axial motion of the ring engages the cam means and moves with the ring axially toward the opposite limit of axial motion of the ring and in passing the cam means swings the latter on its pivot toward one limit whereby on the succeeding advance of the pin means with the ring on a path at the other limit of axial motion of the ring the pin means engages the cam means and moves with the ring toward said one limit and in passing the cams means swings the latter on its pivot toward its other limit.

19. In clocks, a support, an hour ring sleeve journalled on the support for angular motion on a fixed path about an axis, an hour ring mounted on the sleeve and susceptible to axial motions thereon between limits, said sleeve having an axially extending slot in its circumference, a pin engaging said ring and projecting through and beyond said slot and by engagement of the ends of said slot establishing the said limits of axial motion of said ring, said ring and sleeve being coupled for conjoint angular motion, means imparting step-by-step angular motion to the sleeve and ring, whereby said pin traverses a circumferential path, a cam having a generally pointed leading end and an enlarged rounded trailing end, means pivoting said cam between its said ends on said support in the circumferential path of said pin, means forming stops for the movement of said cam on its said pivot whereby said leading end is inclined in one direction or the other when moved against one of said means forming stops, said leading end of said cam reacting said pin in said slot in the sleeve to move the ring axially in one direction at one point in the angular progression of said sleeve, said trailing end reacting to the relative passage of said pin to cock said cam on its said pivot against the other of said means forming stops so that the pin reacts from said leading end of said cam to move the ring axially in the other direction at another point in the angular progression of said sleeve.

20. A clock as recited in claim 16, in which the means for effecting intermittent coupling of a finger with a hook is a solenoid device.

References Cited in the file of this patent

UNITED STATES PATENTS

| | | |
|---|---|---|
| 700,454 | Thrasher | May 20, 1902 |
| 1,348,576 | Odhner | Aug. 3, 1920 |
| 2,173,853 | Naecker et al. | Sept. 26, 1939 |
| 2,266,198 | Haydon | Dec. 16, 1941 |

FOREIGN PATENTS

| | | |
|---|---|---|
| 30,397 | Australia | Feb. 25, 1932 |